United States Patent

Kool et al.

[11] Patent Number: 5,903,609
[45] Date of Patent: May 11, 1999

[54] TRANSMISSION SYSTEM USING TRANSMITTER WITH PHASE MODULATOR AND FREQUENCY MULTIPLIER

[75] Inventors: Leo Kool, Kralendijk; Wilhelmus H. G. Deguelle; Johannes Y. Tichelaar, both of Eindhoven, all of Netherlands

[73] Assignee: U.S. Philips Corporation, New York, N.Y.

[21] Appl. No.: 08/659,385

[22] Filed: Jun. 6, 1996

[30] Foreign Application Priority Data

Jun. 8, 1995 [EP] European Pat. Off. ............. 95201506

[51] Int. Cl.⁶ ........................... H04L 23/02; H04L 5/12
[52] U.S. Cl. ........................ 375/261; 375/298; 332/103
[58] Field of Search ................................. 375/261, 256, 375/259, 269, 279, 273, 298, 283, 300, 308; 332/103, 108, 144

[56] References Cited

U.S. PATENT DOCUMENTS

| | | |
|---|---|---|
| 3,854,094 | 12/1974 | Towler . |
| 4,571,549 | 2/1986 | Lods et al. . |
| 5,233,628 | 8/1993 | Rappaport et al. . |
| 5,237,292 | 8/1993 | Chethik . |
| 5,438,592 | 8/1995 | Boccuzzi ................................. 375/283 |
| 5,438,594 | 8/1995 | Podolak .................................. 375/332 |
| 5,539,588 | 7/1996 | Sawaguchi et al. ...................... 360/46 |
| 5,633,893 | 5/1997 | Lampe et al. ........................... 375/297 |

FOREIGN PATENT DOCUMENTS 53-110355  9/1978  Japan ............................. H03C 3/02

*Primary Examiner*—Jason Chan
*Assistant Examiner*—Jean B. Corrielus
*Attorney, Agent, or Firm*—Steven S. Rubin

[57] ABSTRACT

A transmission system for transmitting digital symbols by modulation according to a phase constellation includes a transmitter having a phase modulator and a frequency multiplier in cascade for producing a modulated signal having a desired transmission frequency. To prevent degradation of the bit error rate of such signal, the phase constellation at the input of the phase modulator has at least one additional phase state relative to the phase constellation at the output of the frequency multiplier. Advantageously, the number of phase states of the constellation at the input of the phase modulator is N times the number of phase states of the constellation at the output of the frequency multiplier, where N is the frequency multiplication factor.

12 Claims, 4 Drawing Sheets

TRANSMISSION SYSTEM USING TRANSMITTER WITH PHASE MODULATOR AND FREQUENCY MULTIPLIER

BACKGROUND OF THE INVENTION

1. Field of the Invention

The invention is related to a transmission system comprising a transmitter for transmitting via a transmission medium to a receiver, a carrier modulated by a sequence of digital symbols according to an output constellation having a predetermined number of phase states, said transmitter comprising a cascade connection of a phase modulator and a frequency multiplier.

The invention is further related to a transmitter for transmitting digital symbols modulated on a carrier.

2. Description of the Related Art

A system according to the preamble is known from the Japanese Patent Application laid open under No. 53-110355.

Transmission systems for transmitting digital symbols modulated on a carrier according to a constellation having a predetermined number of phase states are used for a large number of applications. Examples of such applications are mobile radio, radio relay systems, and broadcast systems like Microwave Video Distribution Systems (MVDS). The constellation can vary from BPSK (Binary Phase Shift Keying) or QPSK (Quaternary Phase Shift Keying) to 16.64 and even 256 QAM (Quadrature Amplitude Modulation).

A usual way of generating such a modulated carrier is to modulate a carrier having a fairly low intermediate frequency according to the desired constellation. The desired RF signal, having a frequency that can be in the GHz range (e.g. 27 GHz, 40 GHz), is then obtained by mixing the modulated carrier with a local oscillator signal having a suitable frequency. If the desired frequency is substantially higher than the intermediate frequency complex filters are required to suppress the undesired sideband in the output signal of the mixer. If the desired frequency is above 20 GHz, building blocks such as amplifiers and mixers are required that are able to handle these high frequencies. Such building blocks are difficult to manufacture and are consequently rather expensive.

In the transmission system according to the previously mentioned Japanese Patent Application a cascade connection of a phase modulator and a frequency multiplier is used. The phase modulator modulates a carrier according to a constellation with two phase states $\pi/2$ radians apart. By using a frequency doubler, a signal modulated according to a constellation with two phase states $\pi$ radians apart is obtained. This signal is a common BPSK signal. By using a frequency multiplier to obtain the desired RF signal, only the frequency multiplexer must be able to operate at the desired frequency. The remaining building blocks like amplifiers and mixer have only to operate at a fraction of the desired frequencies, and can consequently be less expensive.

Simulations of the transmission system according to the principle of the Japanese Patent Application show a substantial degradation of the bit error rate in comparison with a system that does not use a frequency multiplier for obtaining the final constellation.

SUMMARY OF THE INVENTION

The object of the present invention is to provide a transmission system according to the preamble in which no substantial degradation of the bit error rate occurs.

The invention is characterized in that the phase modulator is arranged for modulating the sequence of digital symbols on a carrier according to a further signal constellation at the phase modulator having a number of phase states which is larger than the predetermined number of phase states of the output constellation at the output of the frequency multiplier.

The invention is based on the recognition that the degradation of the bit error rate is caused by the asymmetry of the further signal constellation. By introducing at least one additional phase state in the further signal constellation the symmetry can be restored. This is now further explained using a simple example. The case of generating a QPSK signal using a phase modulator and a frequency doubler is considered. It is assumed that the phase states in the output constellation are 0, $\pi/2$, $\pi$, $3\pi/2$. The corresponding phase states in the further constellation at the phase modulator, prior to frequency doubling, are 0, $\pi/4$, $\pi/2$, $3\pi/4$.

If in the output constellation a change from the phase state $3\pi/2$ to the phase state is 0 is required, this can only be realised by a change from the corresponding phase state $3\pi/4$ of the further constellation to the phase state 0 of the further constellation. Such a change results in a phase state trajectory from $3\pi/4$ via $\pi/2$, $\pi/4$ to 0 in the further constellation. In the output constellation a corresponding phase trajectory from $3\pi/2$ via $\pi$, $\pi/2$ to 0 is obtained instead of a direct change from $3\pi/2$ to 0. Due to the longer phase state trajectory, or number of phase states, additional intersymbol interference will occur leading to a decreased bit error rate. It can also be expected that the frequency spectrum will be broader than necessary.

If in this situation, according to the inventive concept, an additional phase state $\pi$ is added to the further constellation, a change from $3\pi/2$ to 0 (or $2\pi$) in the output constellation can be obtained simply by a change from $3\pi/4$ to $\pi$ in the further constellation. Such a change of phase states in the further constellation leads to a direct change from $3\pi/2$ to 0 in the output constellation. Consequently the performance of the transmission system will improve.

An embodiment of the invention is characterized in that the number of phase states of the further constellation is at least equal to the product of the frequency multiplication factor of the frequency multiplier and the number of phase states of the output constellation.

Using a further constellation with this number of phase states will result in an output constellation in which every conceivable change of the phase state can be obtained without passing through other phase states in the output constellation.

A further embodiment of the invention is characterized in that the phase modulator comprises selection means for selecting a phase state of the further constellation corresponding to a phase state in the output constellation in such a way that the phase change in the further constellation is minimal.

Selecting a phase state in the further constellation that minimizes the phase shift in the further constellation results in a minimum intersymbol interference of the output signal of the transmitter.

A further embodiment of the invention is characterised in that the transmitter comprises a first Nyquist filter for filtering the input signal of the frequency multiplier, the receiver comprises a second Nyquist filter for filtering the received signal, and the shape of the transfer function of the first Nyquist filter and the second Nyquist filter are different.

In digital transmission systems in which digital symbols are modulated on a carrier the symbols to be transmitted are represented by square wave signals. If these square wave signals are directly modulated on a carrier the bandwidth of the modulated signal will be excessive. In order to limit the bandwidth of the modulated signal, the signal representing the digital symbols are filtered by a filter. It is also possible to filter the modulated signal. To avoid intersymbol interference by the filtering, the transfer function of the filter has to satisfy the so called Nyquist 1 criterion.

In general the Nyquist filtering is performed by a first Nyquist filter in the transmitter and a second Nyquist filter in the receiver. The cascade of the Nyquist filters now has to satisfy the Nyquist 1 criterion. In such a splitting of the filter operation the shape of the first Nyquist filter and the second Nyquist filter are equal. Simulations have shown that if a phase modulator is connected in cascade with a frequency multiplier the use of equal shapes for the first and second Nyquist filter does not result in a minimum intersymbol interference. By using different shapes for both Nyquist filters a better performance can be obtained. In general is to be expected that the bandwidth of the first Nyquist filer is lower than the bandwidth of the second Nyquist filter.

A further embodiment of the invention is characterised in that the first Nyquist filter is a Raised Cosine filter with a roll off factor between 0.9 and 1, and in that the second nyquist filter is a Raised Cosine filter with a roll off factor between 0.3 and 0.4.

Simulations have shown that using such filters in the transmitter and in the receiver results in a negligible adverse effect of intersymbol interference on the bit error rate.

BRIEF DESCRIPTION OF THE DRAWINGS

The invention will now be explained with reference to the drawings in which.

DETAILED DESCRIPTION OF THE PREFERRED EMBODIMENTS

Figure 1:
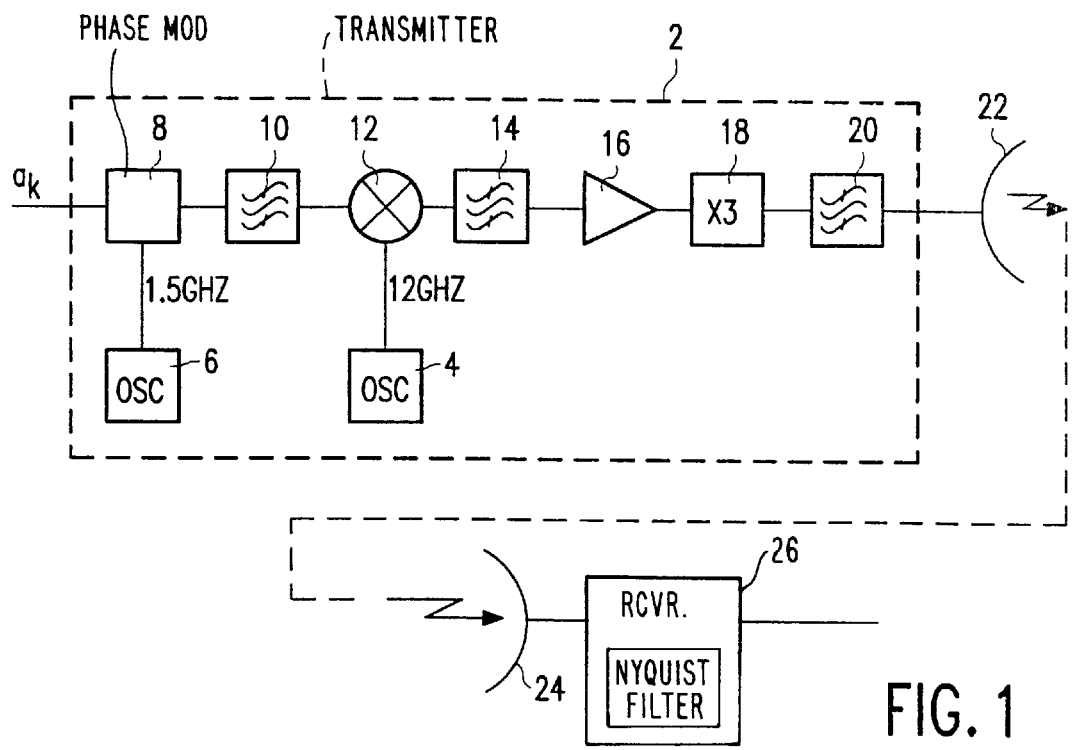
FIG. 1 shows a transmission system according to the invention.

In the transmission system according to FIG. 1, an input of the transmitter 2, carrying the input symbol $a_k$, is connected to a first input of a phase modulator 8. An output of an oscillator 6, with an output frequency of 1.5 GHz is connected to a second input of the phase modulator 8. An output of the modulator 8 is connected to an input of a bandpass filter 10. The output of the bandpass filter 10 is connected to a first input of a mixer 12. An output of an oscillator 4, with an output frequency of 12 GHz, is connected to a second input of the mixer 12.

An output of the mixer 12 is connected to an input of a bandpass filter 14. The output of the bandpass filter 14 is connected to an input of an amplifier 16. The output of the amplifier 16 is connected to an input of a frequency multiplier 18, being here a frequency tripler 18. The output of the frequency tripler 18 is connected to antenna 22 via a bandpass filter 20.

An antenna 24 is connected to an input of a receiver 26. At the output of the receiver 26 the reconstructed digital symbol $â_k$ are available.

The carrier signal generated by the oscillator 6 is modulated in phase according to a further constellation according to the invention by the phase modulator 8. The phase modulated output signal of the phase modulator is filtered by the bandpass filter 10 in order to limit the bandwidth thereof.

The transfer function of the bandpass filter 10 is a so-called square root Nyquist filter. The transfer function of such a filter fulfils the following requirement:

$$|H(f)|^2 = \begin{cases} C & ; |f - f_a| \leq \frac{1-\alpha}{2T} \\ C \cdot \cos\frac{\Pi T}{2\alpha}\left(|f - f_a| - \frac{1+\alpha}{2T}\right) & ; \frac{1-\alpha}{2T} \leq |f - f_a| \leq \frac{1+\alpha}{2T} \\ 0 & ; |f - f_a| \geq \frac{1+\alpha}{2T} \end{cases} \quad (1)$$

In (1) is C a constant, T the symbol period, $\alpha$ the so-called roll off factor, f the frequency and $f_a$ the frequency of the signal generated by the local oscillator 6. It is known that the use of this type of filter reduces the bandwidth of the output signal of the phase modulator 8 without introducing intersymbol interference at instants t=nT if the receiver uses a similar filter. The adverse effect of intersymbol interference is substantially zero for a filter having $\alpha=1$ in the transmitter and a filter having $\alpha=0.35$ in the receiver. In general a value of $\alpha$ between 0.9 and 1 for the filter in the transmitter, and a value of $\alpha$ for the filter in the receiver is a good choice.

The output signal of the bandpass filter 10 is mixed with the output signal of the oscillator 4 by the mixer 12. The output signal of the mixer 12 now has a frequency of 13.5 GHz. The bandpass filter 14 removes the undesired lower sideband at 10.5 GHz and passes only the desired signal with a frequency of 13.5 GHz. This 13.5 GHz signal is amplified in the amplifier 16 and subsequently tripled in the tripler 18. The output signal of the tripler 18 is filtered by means of the band pass filter 20, to remove all output components but the desired output signal at 40.5 GHz. The 40.5 GHz signal is radiated by the antenna 22.

The antenna 24 receives the signal emitted by the transmitter 2. The output signal of the antenna 24 is demodulated and detected in the receiver 26. At the output of the receiver 26 the reconstructed symbols $â_k$ are available.

Figure 2:
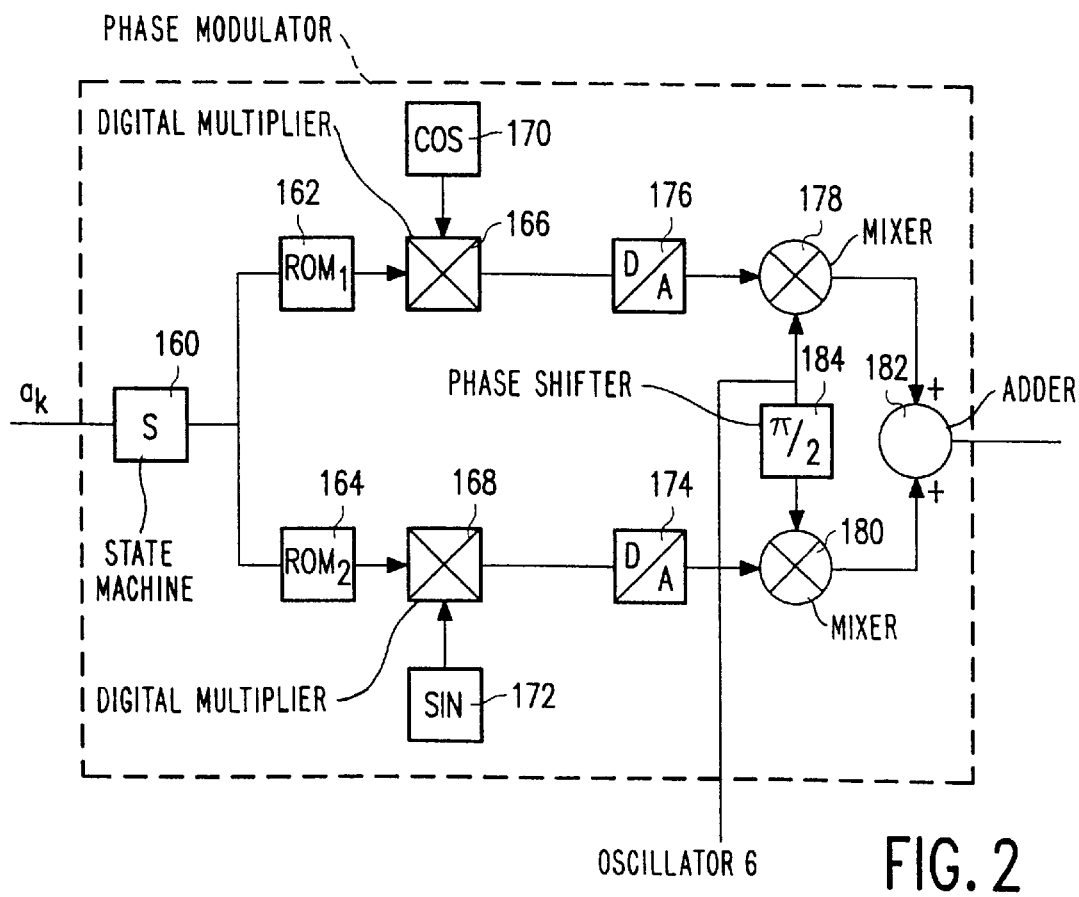
FIG. 2 shows a phase modulator such as may be used in FIG. 1.

In the phase modulator according to FIG. 2, the symbols $a_k$ are applied to an input of a finite state machine 160. The output of the finite state machine S, carrying an output signal indicating the phase state actually to be transmitted is connected to address inputs of a read only memory 162 and to address inputs of a read only memory 164.

The output of the read only memory 162 is connected to a first input of a digital multiplier 166. An output of a digital cosine generator 170 is connected to a second input of the digital multiplier 166. The output of the read only memory 164 is connected to a first input of a digital multiplier 168. An output of a digital sine generator 172 is connected to a second input of the digital multiplier 168.

The output of the digital multiplier 166 is connected to an input of a digital to analog converter 176, and the output of the digital multiplier 168 is connected to an input of a digital to analog converter 174.

The output of the digital to analog converter 176 is connected to a first input of a mixer 178. The output of the digital to analog converter 174 is connected to a first input of a mixer 180.

The signal from the oscillator 6 in FIG. 1 is applied to a second input of the mixer 178 and to an input of a π/2 phase shifter 184. An output of the π/2 phase shifter is connected to a second input of the mixer 180.

An output of the mixer 178 is connected to a first input of an adder 182 and an output of the mixer 180 is connected to a second input of the adder 182. At the output of the adder 182 a modulated signal is available.

In the modulator according to FIG. 2 the finite state machine 160 provides in response to the symbols $a_k$ an output signal representing the phase state in the further constellation according to the invention associated with the symbol $a_k$ to be transmitted. The output signal of the finite state machine 160 is used to address the read only memories 162 and 164. The read only memory 162 provides the real part of the derived phase state in the further constellation, and the read only memory 164 provides the imaginary part of the desired phase state in the further constellation. The output signal of the read only memory 162 is multiplied by a cosine signal generated by the cosine generator 170. In order to simplify the multiplier the cosine signal can be represented by a sequence +1, −, −1, +1 . . . The use of such a representation allows a substantial reduction of the complexity of the multiplier 166 because it has only to provide multiplications with +1, −1 and 0, which can be easily implemented.

The output signal of the read only memory 164 is multiplied by a sine signal generated by the sine generator 172. The sine generator 172 generated a sequence 0, +1, 0, −1, 0, +1 . . . being 90° out of the phase with respect to the output signal of the cosine generator 170. Consequently at the outputs of the multipliers 166 and 168 a quadrature signal is available, representing a carrier modulated according to the further constellation. By means of the digital to analog converters 176 and 174, the digital quadrature signal is converted into an analog quadrature signal. The quadrature signal represented by the output signals of the digital-analog converters 174 and a 176 is converted to a frequency of 1.5 GHz by the quadrature mixer constituted by the mixers 178 and 180, the adder 182 and the phase shifter 184.

Figure 3:
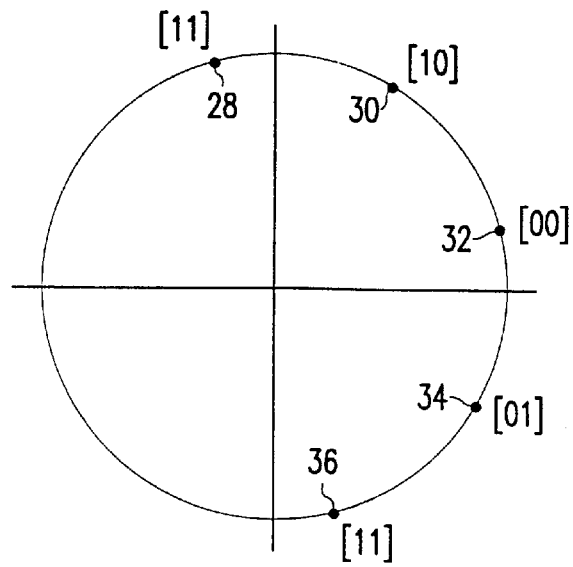
FIG. 3 shows a first example of a further constellation to be used with a frequency doubler to obtain a QSPK signal.

In FIG. 3 is a further constellation having phase states which, after frequency doubling, will result in an output constellation corresponding to a quadrature phase shift keying signal. Specifically, according to the inventive idea, in the further constellation an additional phase state 28 is added to the phase states 30, 32, 34 and 36. The phase states 30, 32, 34 and 36 correspond to phases 3π/8, π/8, −π/8 and −3π/8 with respect to the positive real axis. After frequency doubling this results in phase states 3π/4, π/4 and −3π/4 respectively, which is in accordance with a QPSK signal.

To prevent a degradation of the bit error rate at a transition from phase state 30 to phase state 36 the additional phase state 28 is introduced, to enable to obtain the corresponding change in phase state in the output QPSK constellation without a large number of phase transitions in the further constellation.

Figure 4:
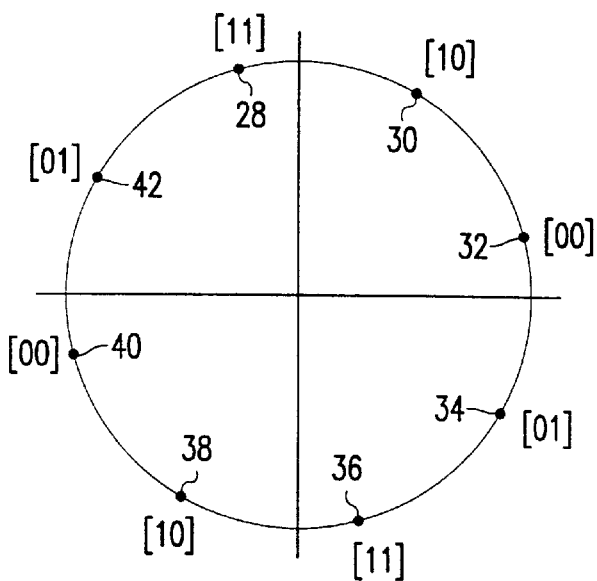
FIG. 4 shows a second example of a further constellation to be used with a frequency tripler to obtain a QPSK signal.

In FIG. 4 is a further constellation in which each conceivable phase state change is possible. For each phase state in the output constellation there are two corresponding states in the further constellation. E.g. for an input sequence 00 there are the phase states 32 and 40, which both lead to a phase state corresponding to π/4 in the output constellation. The phase state in the further constellation to choose depends on the previous phase state chosen in the further constellation. The phase state in the further constellation is that one which is nearest to the previous phase state in the further constellation. For a previous phase state in the further constellation the choice is made randomly. This can be implemented by making the choice dependent on the output signal of a (binary) random generator. The above mentioned rules can be implemented in a finite state machine of which the new (phase) state in dependence on the previous (phase) state and the input signal and the random signal is presented in the table below. In said table the logical value "x" means a "don't care"

| OLD PHASE STATE | INPUT | RANDOM | NEW PHASE STATE |
| --- | --- | --- | --- |
| 28 | 00 | 0 | 32 |
|    | 00 | 1 | 40 |
|    | 01 | x | 42 |
|    | 10 | x | 30 |
|    | 11 | x | 28 |
| 30 | 00 | x | 32 |
|    | 01 | 0 | 34 |
|    | 01 | 1 | 42 |
|    | 10 | x | 30 |
|    | 11 | x | 28 |
| 32 | 00 | x | 32 |
|    | 01 | x | 34 |
|    | 10 | x | 30 |
|    | 11 | 0 | 36 |
|    | 11 | 1 | 28 |
| 34 | 00 | x | 32 |
|    | 01 | x | 34 |
|    | 10 | 0 | 38 |
|    | 10 | 1 | 30 |
|    | 11 | x | 36 |
| 36 | 00 | 0 | 40 |
|    | 00 | x | 32 |
|    | 01 | x | 34 |
|    | 10 | x | 38 |
|    | 11 | x | 36 |
| 38 | 00 | x | 40 |
|    | 01 | 0 | 42 |
|    | 01 | 1 | 34 |
|    | 10 | x | 38 |
|    | 11 | x | 36 |
| 40 | 00 | x | 40 |
|    | 01 | x | 42 |
|    | 10 | x | 38 |
|    | 11 | 0 | 28 |
|    | 11 | 1 | 36 |
| 42 | 00 | x | 40 |
|    | 01 | x | 42 |
|    | 10 | 0 | 30 |
|    | 10 | 1 | 38 |
|    | 11 | x | 28 |

The implementation of such a finite state machine is known to those skilled in the art. Because there are 8 output states, the output signal of the finite state machine can be represented by 3 bits.

Figure 5:
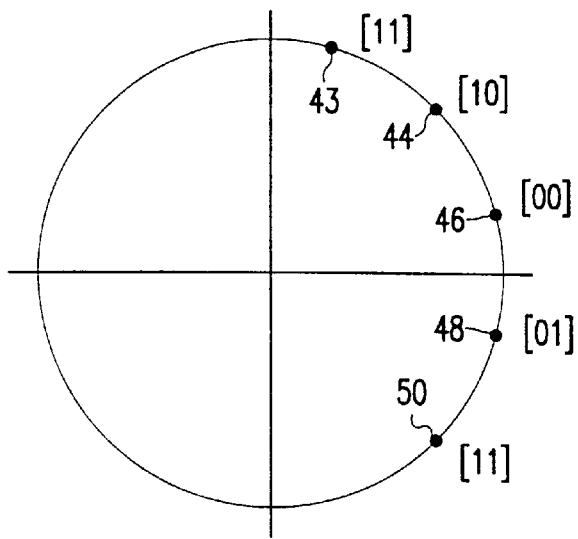
FIG. 5 shows a third example of a further constellation to be used with a frequency tripler to obtain a QPSK signal.

In FIG. 5 a further constellation is shown, by which a QPSK signal can be obtained by using a frequency tripler. The phase states are here spaced π/12 apart. In general this is φ/n, in which n is the frequency multiplication factor and in which φ is the desired phase shift in the output constellation. In the further constellation according to FIG. 5 an additional phase state 43 is introduced in order to deal with a transition from 3π/4 to 5π/4 in the output constellation, without needing to pass other phase states in the output constellation.

Figure 6:
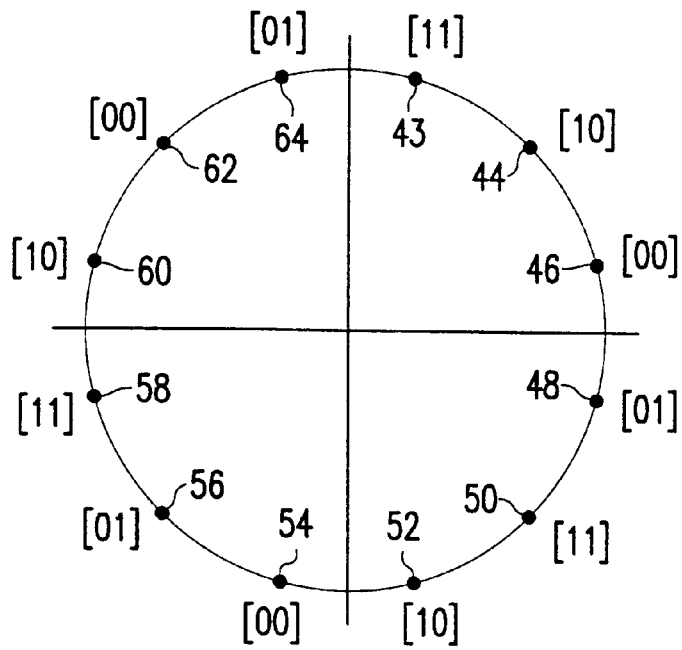
FIG. 6 shows an example of a further constellation to be used with a frequency tripler to obtain a 16-QAM signal.

In FIG. 6 a further constellation to be used with a frequency tripler is shown which leads to an output constellation in which every conceivable phase change is possible. Because this further constellation has to be used with a frequency tripler, the number of phase states in the further constellation is 12 rather than 8 which was the number of phase states in a similar constellation to be used with a frequency doubler.

For each of the four phase states in the output constellation there are now three corresponding states in the further constellation according to FIG. 5. E.g. for an input sequence of 00, there are the phase states 46, 54 and 62 in the further constellation, all leading to a phase state π/4 in the output constellation. The criterion for choosing a phase state in the further constellation is the same as the criteria used with the further constellation according to FIG. 4. Below is the state transition table for the initial state 43:

| OLD PHASE STATE | INPUT | RANDOM | NEW PHASE STATE |
|---|---|---|---|
| 42 | 00 | 0 | 46 |
|  | 00 | 1 | 62 |
|  | 01 | x | 64 |
|  | 10 | x | 44 |
|  | 11 | x | 43 |

The phase state transition table can be easily expanded for all initial phase states by using the criterion explained above.

Figure 7:
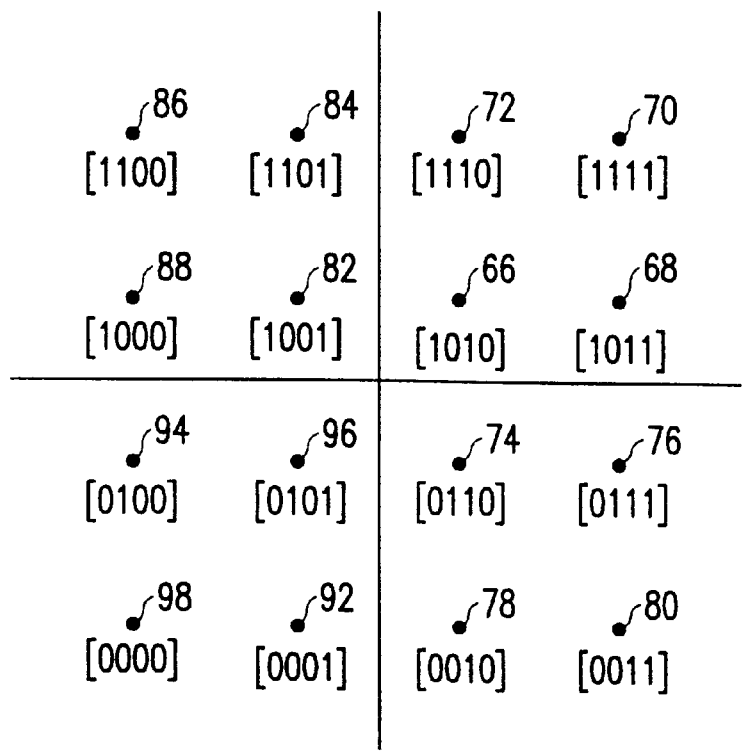
FIG. 7 is a diagram of a 16 QAM output constellation which could be produced in accordance with the invention.

The output constellation according to FIG. 7 is a 16 QAM constellation. The binary numbers between brackets are the values of four subsequent bits corresponding to the phase-amplitude state.

Figure 8:
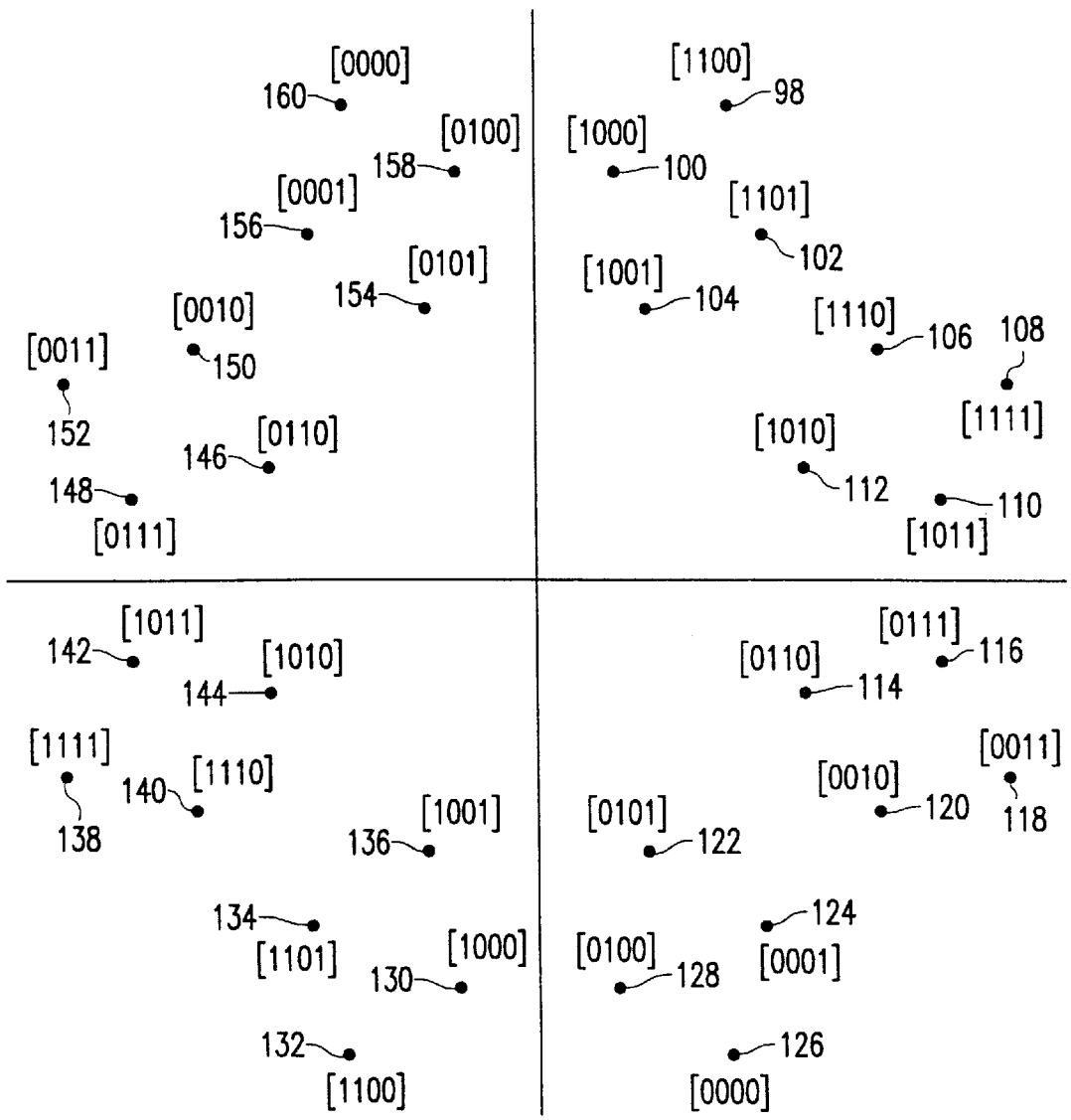
FIG. 8 is a diagram of a further constellation implemented with a frequency tripler.

FIG. 8 shows a further constellation to be used with a tripler, corresponding to the output constellation. In general for a phase amplitude state in the further constellation one can write:

$$r_f = a \cdot \sqrt[n]{r_0} \quad (2)$$

$$\varphi_f = \frac{\varphi_0}{n} = \frac{k \cdot 2\pi}{n} \quad (3)$$

In (2) $r_f$ is the amplitude corresponding to the respective phase-amplitude state in the further constellation, a is a proportionality constant, n is the frequency multiplication factor and $r_o$ the amplitude corresponding to the phase-amplitude state in the output constellation.

In (3) $\phi_f$ is the phase corresponding to the respective state of the further constellation, $\phi_o$ the phase corresponding to the respective phase of the output constellation and k an integer between 1 and k.

The further constellation according to FIG. 8 is derived from the output constellation according to FIG. 7 by applying (2) and (3) using n=2 the phase-amplitude states in the first and fourth quadrant are the phase-amplitude states with a value of k equal to 0 and the phase-amplitude states in the second and third quadrant correspond to k equal to 1. As can be seen from FIG. 8, for each phase-amplitude state in the output constellation two corresponding phase amplitude states exist. These phase-amplitude states are positioned symmetrically with respect to the origin. The choice between two possible phase-amplitude states in the further constellation can be made according to the criterion disclosed above. Below the state transition table for initial phase-amplitude state 106 is shown.

| INITIAL STATE | INPUT | RANDOM | NEW STATE |
|---|---|---|---|
| 100 | 0000 | X | 160 |
|  | 0001 | X | 156 |
|  | 0010 | X | 150 |
|  | 0011 | X | 152 |
|  | 0100 | X | 158 |
|  | 0101 | X | 154 |
|  | 0110 | X | 146 |
|  | 0111 | 0 | 116 |
|  | 0111 | 1 | 148 |
|  | 1000 | X | 100 |
|  | 1001 | X | 104 |
|  | 1010 | X | 112 |
|  | 1011 | X | 100 |
|  | 1100 | X | 98 |
|  | 1101 | X | 102 |
|  | 1110 | X | 106 |
|  | 1111 | X | 108 |

The state transition table can be easily expanded for the complete constellation according to the criterion mentioned above.

We claim:

1. A transmission system including a transmitter for transmitting to a receiver via a transmission medium a carrier wave which is phase modulated by a sequence of digital symbols, the phase modulation being in accordance with a transmitter output constellation, said transmission system comprising:

an oscillator for generating a local carrier wave;

a phase modulator for modulating and creating the local carrier wave with said sequence of digital symbols in accordance with an additional constellation of phase states, the number of phase states in said additional constellation being greater than the number of phase states in said output constellation;

phase states of said additional constellation of phase states defining corresponding phase states of said output constellation of phase states;

whereby a desired new output constellation phase state is produced by creating a new additional constellation phase state; and where said production of said new output constellation phase state requires less transient phase states of said output constellation than if said additional constellation did not have a greater number of phase states than said output constellation.

2. A transmission system according to claim 1, wherein the number of phase states of the additional constellation is at least equal to the product of a frequency multiplication factor N and the number of phase states of the output constellation.

3. A transmission system according to claim 2, wherein the phase modulator comprises selection means for selecting a phase state of the additional constellation corresponding to the desired phase state in the output constellation in such a way that the phase change from a previous phase state in the output constellation is minimized.

4. A transmission system according to claim 1, wherein the phase modulator comprises selection means for selecting a phase state of the additional constellation corresponding to the desired phase state in the output constellation in such a way that a phase change from a previous phase state in the output constellation is minimized.

5. A transmission system according to claim 4, wherein the selection means is arranged to select the phase state of the additional constellation randomly out of the number of phase states therein resulting in a minimal phase change from the previous phase state in the output constellation.

6. The transmission system according to claim 1, wherein the transmitter further comprises a first Nyquist filter for filtering an input signal of the frequency multiplier, the receiver comprises a second Nyquist filter for filtering the carrier wave which is phase modulated by the sequence of digital symbols and the shape of the transfer function of the first Nyquist filter differs from that of the second Nyquist filter.

7. A transmission system according to claim 6, wherein the first Nyquist filter is a Raised Cosine filter with a roll off factor between 0.9 and 1, and the second Nyquist filter is a Raised Cosine filter with a roll off factor between 0.3 and 0.4.

8. A transmitter for transmitting a carrier wave which is phase modulated by a sequence of digital symbols, the phase modulation being in accordance with a transmitter output constellation having a predetermined number of phase states; said transmitter comprising:

an oscillator for generating a local carrier wave;

a phase modulator for modulating the local carrier wave with said sequence of digital symbols in accordance with an additional constellation of phase states, the number of phase states in said additional constellation being greater than the number of phase states in said output constellation;

phase states of said additional constellation of phase states defining corresponding phase states of said output constellation of phase states;

whereby a desired new output constellation phase state is produced by creating a new additional constellation phase state; and where said production of said new output constellation phase state requires less transient phase states of said output constellation than if said additional constellation did not have a greater number of phase states than said output constellation.

9. A transmitter according to claim 8, wherein the number of phase states of the additional constellation is at least equal to the product of a frequency multiplication factor N and the number of phase states of the output constellation.

10. A transmitter according to claim 9, wherein the phase modulator comprises selection means for selecting a phase state of the additional constellation corresponding to the desired phase state in the output constellation in such a way that the phase change from a previous phase state in the output constellation is minimized.

11. A transmitter according to claim 8, wherein the phase modulator comprises selection means for selecting a phase state of the additional constellation corresponding to the desired phase state in the output constellation in such a way that a phase change from a previous phase state in the output constellation is minimized.

12. A transmitter according to claim 11, wherein the selection means are arranged to select the phase state of the additional constellation randomly out of the number of phase states therein resulting in a minimal phase change from the previous phase state in the output constellation.

* * * * *